United States Patent
Gonin et al.

(10) Patent No.: US 8,118,351 B2
(45) Date of Patent: Feb. 21, 2012

(54) MOTOR VEHICLE FRONT-END PANEL COMPRISING A STRUCTURAL FRAME AND A BUMPER

(75) Inventors: Vincent Gonin, Sochaux (FR); Julien Dufee, Novillard (FR); Laurent Droz-Bartholet, Hericourt (FR)

(73) Assignee: Faurecia Bloc Avant, Nanterre (FR)

( * ) Notice: Subject to any disclaimer, the term of this patent is extended or adjusted under 35 U.S.C. 154(b) by 7 days.

(21) Appl. No.: 12/646,386

(22) Filed: Dec. 23, 2009

(65) Prior Publication Data

US 2010/0244487 A1    Sep. 30, 2010

(30) Foreign Application Priority Data

Mar. 26, 2009 (FR) ...................... 09 01440

(51) Int. Cl.
*B60R 19/02*    (2006.01)
*B62D 25/08*    (2006.01)
(52) U.S. Cl. .......... 296/193.09; 296/187.09; 296/203.02
(58) Field of Classification Search .................. 293/109, 293/110, 115, 136, 180, 132, 133, 120, 146; 296/35.2, 136.08, 187.01, 187.03, 190.3, 296/193.09, 93, 181.2, 187.09, 193.1, 203.01, 296/203.02, 901.01; 280/770; 188/371, 188/377

See application file for complete search history.

(56) References Cited

U.S. PATENT DOCUMENTS

| 6,547,317 | B1 | 4/2003 | Cheron et al. |
| 7,681,700 | B2 * | 3/2010 | Ginja et al. ................... 188/377 |
| 2002/0060476 | A1 | 5/2002 | Cantineau et al. |

FOREIGN PATENT DOCUMENTS

| EP | 1095844 | 5/2001 |
| EP | 1032526 | 8/2003 |
| FR | 2810940 | 1/2002 |
| WO | 2007028908 | 3/2007 |
| WO | WO 2008087346 A2 * | 7/2008 |
| WO | WO 2008110709 A2 * | 9/2008 |

OTHER PUBLICATIONS

International Search Report dated Aug. 26, 2009, in French application.

* cited by examiner

*Primary Examiner* — Dennis Pedder
*Assistant Examiner* — Jason S Daniels
(74) *Attorney, Agent, or Firm* — Young & Thompson

(57) ABSTRACT

Such a distribution of the ribs 52 makes it possible to determine the behavior of the bumper under impact. In particular, the behavior of the bumper 4 varies depending on the point of impact on said bumper 4 upon collision. The bumper 4 according to the invention makes it possible to satisfy pedestrian impact standards, which are becoming ever more stringent. In particular, in the case of a pedestrian impact, provision must be made for deceleration of the pedestrian's knee, irrespective of the point of impact of the knee.

9 Claims, 3 Drawing Sheets

MOTOR VEHICLE FRONT-END PANEL COMPRISING A STRUCTURAL FRAME AND A BUMPER

FIELD OF THE INVENTION

The present invention relates to a motor vehicle front-end panel assembly of the type fixed to side struts and cradle extensions of the motor vehicle chassis, said assembly comprising a plastic material structural frame comprising at least a lower cross member and vertical struts, each of said struts forming, over at least a portion of its height, a deformable energy absorption component, the assembly further comprising a plastic material bumper formed so as to match the shape of a bumper skin and arranged against the structural frame, said bumper comprising an upper cross member and a lower cross member interconnected via vertical connecting beams, the upper and lower cross members each having a central portion and two lateral portions arranged on either side of the central portion, said cross members comprising a plurality of ribs.

The present invention also relates to a motor vehicle comprising a front-end panel assembly of this type.

BACKGROUND OF THE INVENTION

Motor vehicle front-end panel assemblies are provided so as to react sufficiently to different types of impact sustained by the motor vehicle, such as "pedestrian" impacts at approximately 40 km/h, "parking" impacts at approximately 4 km/h (ECE42) and "reparability" impacts at approximately 15 km/h (Danner impacts) whilst reducing production costs.

In order to provide energy absorption, a large number of components are provided in order to react as effectively as possible depending on the type of impact sustained by the vehicle. For example, a shock absorber in the form of a resiliently deformable component is provided for pedestrian impacts and constructed so as to be crushed upon collision with a pedestrian. At least a metal transverse beam is provided for parking impacts, and metal, deformable energy absorption components or "crash boxes" are provided for reparability impacts. This large number of components complicates production of the front-end panel assembly and also adds considerable weight to the motor vehicle, in particular owing to the metal components provided.

One object of the invention is to provide a front-end panel assembly which enables satisfactory shock absorption whilst reducing the number of components, and which can be produced at low cost and reduced weight.

SUMMARY OF THE INVENTION

The invention therefore relates to a front-end panel assembly of the aforementioned type, in which the concentration of ribs in the central portion of the upper cross member and/or the lower cross member is greater than the concentration of ribs of each lateral portion of the upper cross member and/or lower cross member.

A front-end panel assembly of this type makes it possible to considerably reduce the number of components forming the assembly and to forgo a metal transverse beam, reducing the weight of the assembly. In addition, the bumper makes it possible to forgo the shock absorber for pedestrian impacts. The front-end panel assembly according to the invention thus makes it possible to react satisfactorily to different types of impact.

In accordance with other features of the front-end panel assembly:

the ribs define cells, at least a portion of the cells passing longitudinally through the upper cross member and the lower cross member;

the central portion of the upper cross member, or that of the lower cross member, extends over a width of substantially between 400 mm and 600 mm at the centre of the upper cross member, or at that of the lower cross member respectively;

the ribs of the central portion of the upper and/or lower cross member are spaced at a distance of substantially between 45 mm and 90 mm and the ribs of the lateral portions of the upper and/or lower cross member are spaced at a distance of substantially between 60 mm and 120 mm;

the vertical connecting beams have a cellular structure consisting of cells extending longitudinally through the beams and opening onto the rear and/or front face of the bumper;

each connecting beam comprises first blind cells, closed on the rear face side and open on the front face side, and second blind cells open on the rear face side and closed on the front face side;

the front-end panel module further comprises two rigid metal plates, of which one face is pressed onto side struts and cradle extensions of the motor vehicle chassis, the vertical struts of the structural frame being arranged against the other face of said plates;

the front face of the bumper is provided with a plurality of fixing means enabling a bumper skin and/or motor vehicle accessories to be fixed to said bumper;

the bumper is formed in one piece; and the upper and lower cross members of the bumper comprise at least a portion projecting in a forward direction relative to the vertical connecting beams.

The invention also relates to a motor vehicle comprising a chassis equipped with side struts and cradle extensions, in which a front-end panel assembly as described above is fixed to said side struts and to said cradle extensions.

BRIEF DESCRIPTION OF THE DRAWINGS

Other features and advantages of the invention will become clear upon reading the following description, given by way of example and with reference to the accompanying drawings, in which.

DETAILED DESCRIPTION OF THE PREFERRED EMBODIMENT

Within this description, the terms "longitudinal", "transverse", "front", "rear", "horizontal" and "vertical" are defined in accordance with the conventional directions of an assembled motor vehicle.

Figure 1:
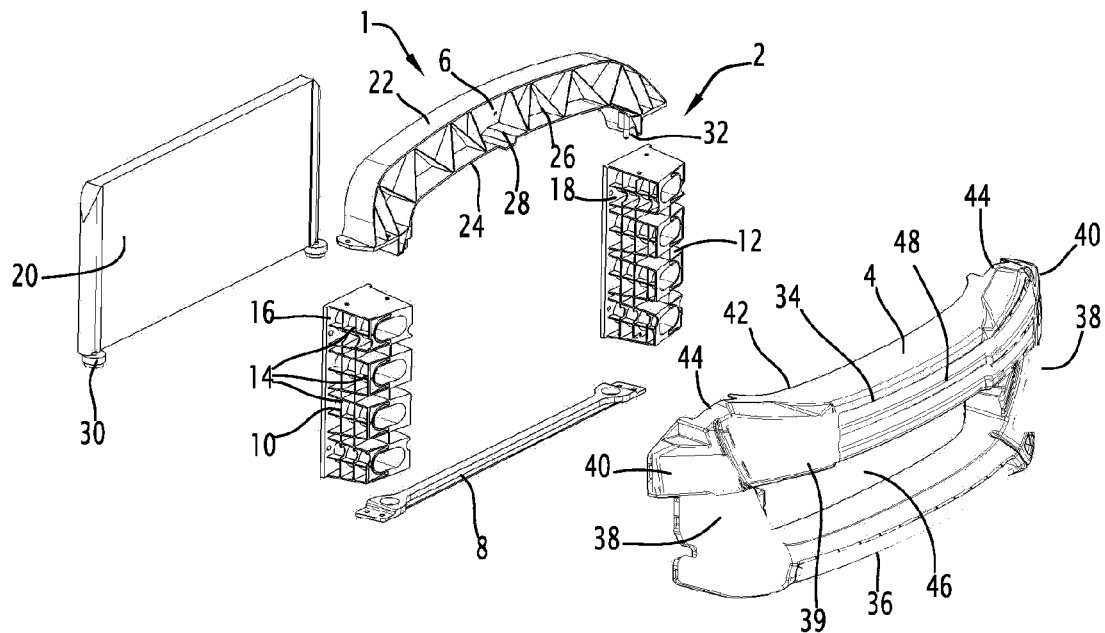
FIG. 1 is a schematic, exploded perspective view of a front-end panel assembly according to the invention.

With reference to FIG. 1, a front-end panel assembly 1 substantially comprising a structural frame 2 and a bumper 4 is described. The front-end panel assembly 1 is fixed to side struts and cradle extensions of the motor vehicle chassis (not shown). For reasons of simplicity, the structure of the bumper 4 has not been illustrated in full in FIG. 1.

The structural frame 2 contributes to the rigidity of the vehicle body. It comprises an upper cross member 6, a lower cross member 8 and right 10 and left 12 vertical struts.

The right vertical strut 10 and the left vertical strut 12 of the structural frame 2 are each formed by a plurality of deformable components 14. In the embodiment shown, four deformable components 14 are stacked in the vertical direction. In a variant, a vertical strut is formed by a continuous deformable ramp. A component or a deformable ramp is a substantially parallelepiped structure able to absorb some of the energy of an impact by being crushed in a depthwise direction.

The rear face of a vertical strut 10 and/or 12 is pressed onto most of the surface of an extended metal plate 16, 18 connecting, on the same side of the vehicle, the ends of a cradle extension arranged at a lower level and of a side strut arranged at a higher level.

The lower cross member 8 of the structural frame 2 connects the lowermost absorption components 14 of the vertical struts 10 and 12. The lower cross member 8 has a generally rectangular cross-section. The central portion of the lower cross member 8 narrows in the vertical direction in such a way that its upper face has a recess for receiving a cooling system, generally denoted by the reference numeral 20. For example, the cooling system 20 comprises an electric fan assembly and a radiator. The lower cross member 8 is advantageously made of plastics material. In a variant, this cross member may be metal and connected directly to the lower end of each of the cradle extensions so as to increase its contribution to the strength and rigidity of the vehicle body in a normal driving or crash situation.

The upper cross member 6 of the structural frame 2 connects the uppermost deformable components 14 of the right 10 and left 12 vertical struts. The upper cross member 6 is generally arc-shaped. As a lattice beam, the upper cross member 6 comprises an upper flange 22 and a lower flange 24 interconnected via reinforcing ribs 26. The reinforcing ribs are arranged so as to form inner triangular compartments. The cross-section of the upper cross member 6 in the median vertical plane is rhombus-shaped with an upper side arranged substantially horizontally and corresponding to the upper flange 22, a lower side corresponding to the lower flange 24, and the front and rear sides inclined upwards and towards the rear of the vehicle. The upper cross member 6 thus extends towards the rear of the vertical plane defined by the lower cross member 8 and the vertical struts 10 and 12. The construction disclosed above is given as a non-limiting exemplary embodiment.

The upper flange 22 of the upper cross member 6 is adjusted so as to cooperate with a component of the vehicle body and in particular with a bonnet of said vehicle. An inner face of the bonnet oriented towards the inside of the vehicle covers the upper flange 22, which is shaped for this purpose.

A median portion of the upper cross member 6 has a recess 28 for receiving means for locking the bonnet, which means cooperate with conjugate locking means provided on the bonnet.

Means for retaining the cooling system 20 are provided on the lower flange 24 of the upper cross member 6. In a particularly advantageous embodiment of the front end panel assembly, the lower edge of the cooling system 20 is connected to the lower cross member 8 via fixing tongues 30, whereas the upper edge of the radiator 20 is connected via fixing tongues 32 to the upper cross member 6. The tongues 30, 32 are advantageously frangible or fusible so as to protect the cooling system 20 upon medium-speed impact by separating the cooling system from the structural frame 2 under impact.

Taking into account the specific features of the front block, produced for the most part in plastics materials, the semicircular groove for fixing the securing ring, conventionally fixed on the upper beam of the bumper or incorporated in an upper absorption component, will advantageously be situated in the region of the large metal plate or fixed directly to the upper side strut.

The one-piece structural frame 2 is preferably made of a plastics material, for example by injection of a thermoplastic material. The upper 6 and lower 8 cross members and the vertical struts 10 and 12 are formed in one piece. In a variant, the lower cross member 8 and the vertical struts 10 and 12 are formed in one piece so as to form a U-shaped part, and the upper cross member 6 is then fixed, for example by adhesive bonding, to the upper portion of the vertical struts 10, 12. In yet another variant and in accordance with the embodiment shown in FIG. 1, the vertical struts 10, 12 are moulded and then fixed to the lower cross member 8, for example by adhesive bonding, so as to form a U-shaped part, to which the upper cross member 6 may then be fixed.

The bumper 4 is arranged against the structural frame 2 towards the front of said frame. For example, said bumper 4 is a one-piece component made of plastics material. The bumper 4 comprises an upper cross member 34 and a lower cross member 36 extending substantially horizontally and transversely and interconnected at each of their ends via a substantially vertical connecting beam 38.

The general shape of the bumper 4 matches the shape of a bumper skin (not shown) to be fixed to the front face 39 of the bumper 4. The bumper 4 extends over the entire width of the front-end panel of the motor vehicle, from one wing to the other of said vehicle.

The upper cross member 34 is arranged substantially level with the uppermost absorption components 14 of the struts 10 and 12 of the frame 2 and extends between these components 14. In accordance with one embodiment, the upper cross member 34 further comprises end portions 40 extending beyond the connecting beams 38 on either side of the bumper. These optional end portions ideally support headlights, bumper skin components or additional accessories.

The lower cross member 36 is arranged substantially level with the lowermost absorption components 14 of the struts 10 and 12 of the frame 2 and extends between these components 14.

Figure 3:
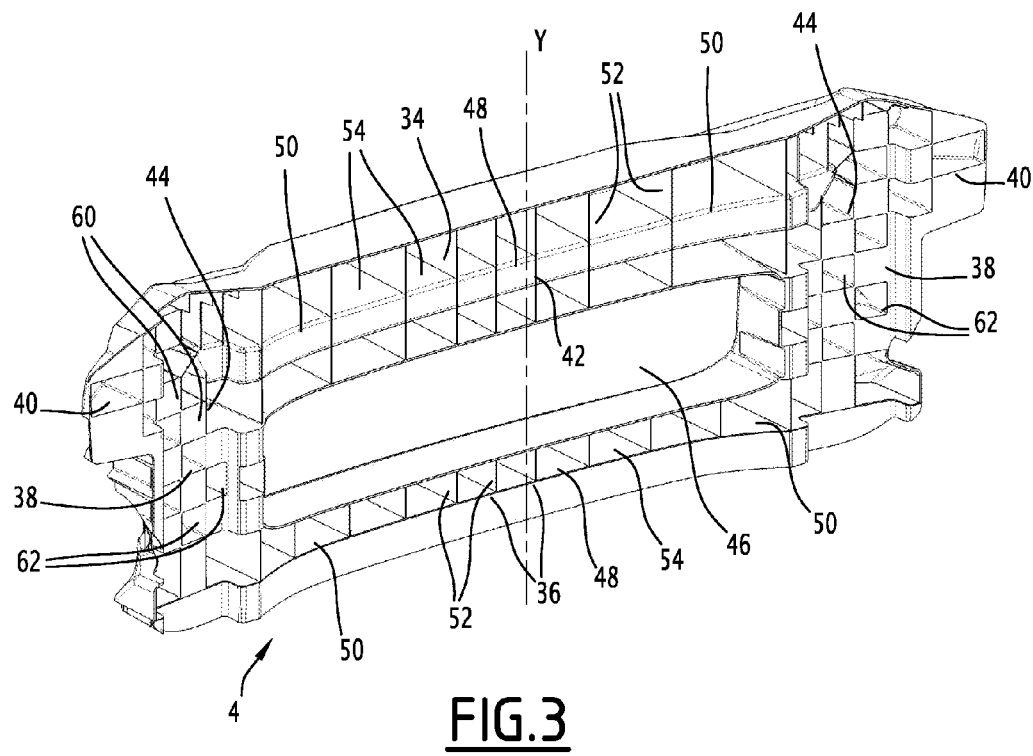
FIG. 3 is a schematic perspective view of the bumper of the front-end panel assembly of FIG. 1, the rear face of the bumper being visible.
Figure 5:
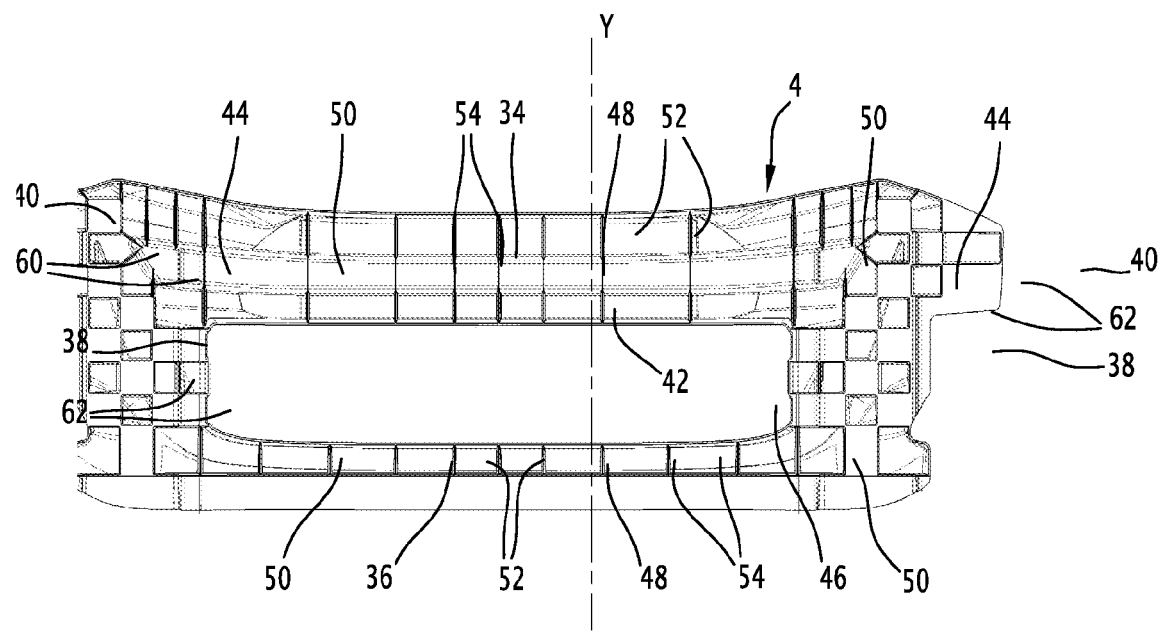
FIG. 5 is a frontal schematic view of the bumper of FIG. 2, the rear face of the bumper being visible.

As illustrated in FIGS. 3 and 5, the rear face 42 of the bumper 4 comprises regions 44 for receiving the struts 10 and 12. Said regions 44 consist of two wide vertical rails and are arranged substantially behind the vertical connecting beams 38.

The upper 34 and lower 36 cross members are outwardly curved in a forward direction. These cross members 34 and 36 thus have a portion projecting in a forward direction relative to the connecting beams 38. A central opening 46 is provided between the cross members 34 and 36 and the connecting beams 38 so as to enable air to pass towards the chassis of the motor vehicle.

The upper 34 and lower 36 cross members extend in the transverse direction over substantially the entire width of the bumper 4 and each comprise a central portion 48 and two lateral portions 50 extending on either side of the central portion 48. The central portion 48 extends substantially to a distance of 200 mm or 300 mm on either side of a central vertical axis Y of the bumper, in other words over a width of substantially between 400 mm and 600 mm at the centre of the upper cross member 34, or at that of the lower cross member 36. The lateral portions 50 extend on each side of the central portion 48 over the remaining width of the cross members 34 and 36. The lateral portions 50 are substantially symmetrical to one another about the central portion 48.

The central 48 and lateral 50 portions comprise a plurality of ribs 52 extending vertically and arranged so as to form cells 54 extending between the front face 39 and the rear face 42 of the bumper 4. In a particular configuration, some of these cells pass through the bumper and may allow air to pass from the front towards the rear of the bumper 4 so as to form an additional air inlet, corresponding with one or more openings in the bumper skin.

The concentration of ribs 52 in the central portion 48 is greater than the concentration of ribs 52 in the lateral portions 50. In other words, the ribs 52 are closer to one another in the central portion 48 than in the lateral portions 50. Thus, the central portion 48 comprises, for example, between four and six ribs 52 spaced from one another at a distance of substantially between 45 mm and 90 mm. The lateral portions 50 each comprise, for example, between two and four ribs 52 spaced from one another at a distance of substantially between 60 mm and 120 mm.

Such a distribution of the ribs 52 makes it possible to determine the behaviour of the bumper under impact. In particular, the behaviour of the bumper 4 varies depending on the point of impact on said bumper 4 upon collision. The bumper 4 according to the invention makes it possible to satisfy pedestrian impact standards, which are becoming ever more stringent. In particular, in the case of a pedestrian impact, provision must be made for deceleration of the pedestrian's knee to remain below 150 g, irrespective of the point of impact of the knee.

Thus, if the impact is centred, in other words the point of impact is in the central portion 48 of the cross members 34 and 36 in a central zone extending over a width of 200 mm on either side of the central axis Y of the bumper, the reduction in deceleration occurs purely by bending of the cross members 34 and 36 over a longitudinal path of substantially between 50 mm and 70 mm.

If the impact is peripheral, in other words the point of impact is in one of the lateral portions 50 of the cross members 34 and 36 in a peripheral zone spaced more than 300 mm from the central axis Y of the bumper, the reduction in deceleration occurs purely by very localised compression of a vertical connecting beam 38 or of a lateral portion 50 of the cross members 34 and 36 over a longitudinal path substantially equal to 50 mm.

If the impact is median, in other words the point of impact is in a zone extending between the central zone and the peripheral zone, the reduction in deceleration occurs by a combination of bending and localised compression of the cross members 34 and 36 over a longitudinal path substantially equal to 50 mm. The particular arrangement of the ribs, spaced farther from one another and advantageously slightly set back relative to the outer wall of the bumper, contributes to said localised flexibility of the lateral portions of the bumper.

The behaviour of the bumper therefore allows a flexible shock absorber to be dispensed with in the case of a pedestrian impact.

Figure 2:
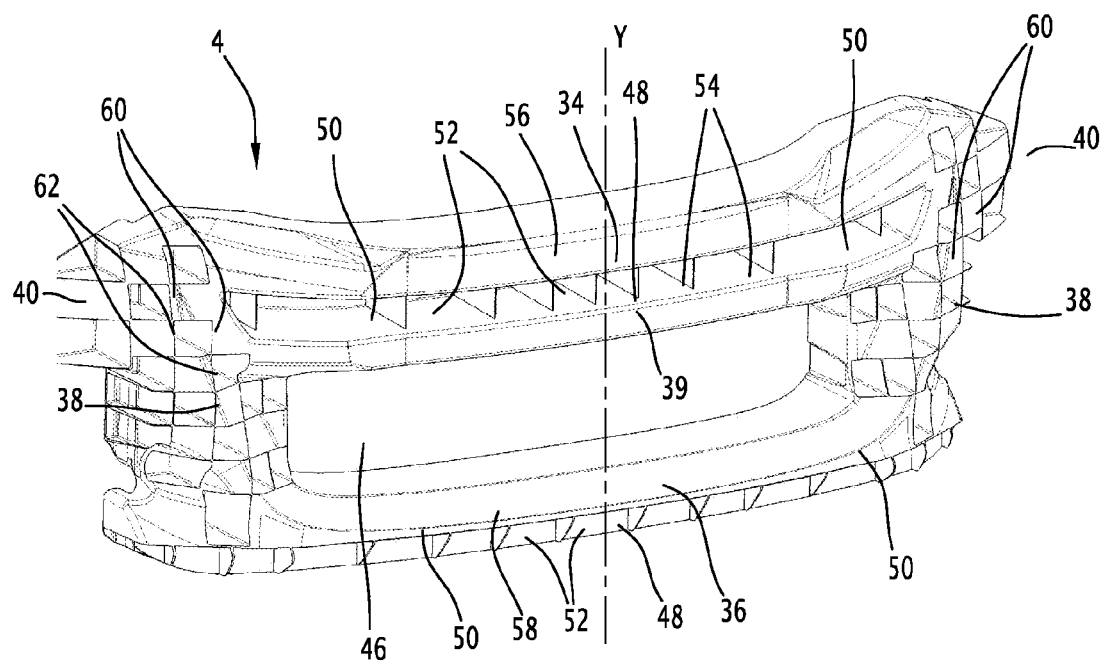
FIG. 2 is a schematic perspective view of the bumper of the front-end panel assembly of FIG. 1, the front face of the bumper being visible.
Figure 4:
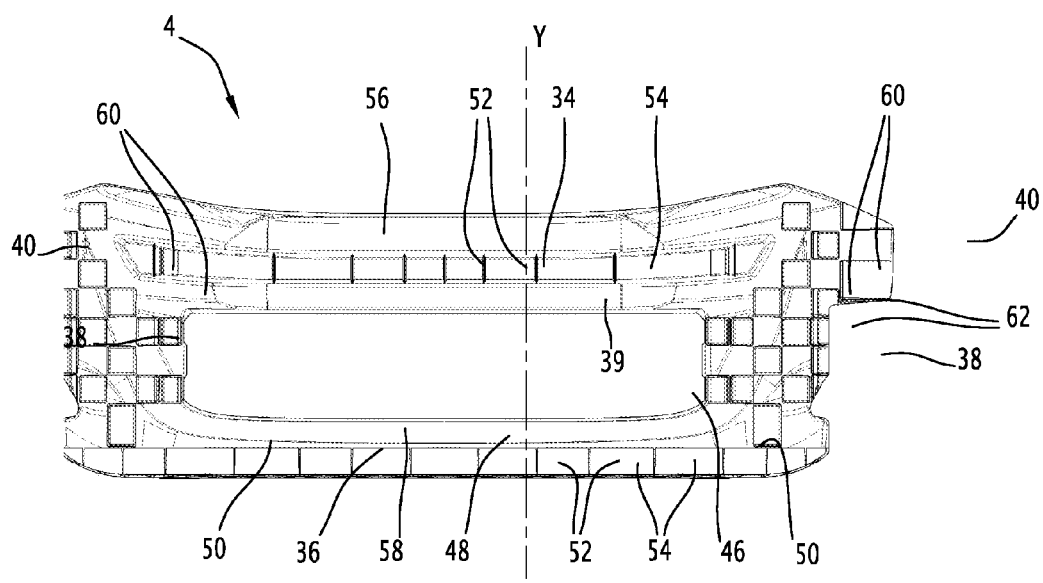
FIG. 4 is a frontal schematic view of the bumper of FIG. 2, the front face of the bumper being visible.

On the front face 39 of the bumper 4, the upper cross member 34 comprises a flattened portion 56 extending substantially in the central portion 48 of the cross member 34 above the ribs 52, as illustrated in FIGS. 2 and 4. On the rear face 42 of the bumper 4, the ribs 52 of the upper cross member 34 extend substantially over the entire height of the cross member 34, as illustrated in FIGS. 3 and 5. Similarly, on the front face 39 of the bumper 4, the lower cross member 36 comprises a flattened portion 58 extending substantially in the central portion 48 of the cross member 34 above the ribs 52, as illustrated in FIGS. 2 and 4. These geometric choices are in no way limiting.

Each vertical connecting beam 38 has a cellular structure comprising cells 60, 62 extending longitudinally between the rear face 42 and the front face 39 of the bumper 4.

Each connecting beam 38 comprises reversed blind cells comprising first blind cells 60, closed on the rear face side 42 and open on the front face side 39, and second blind cells 62 open on the rear face side 42 and closed on the front face side 39. The first cells 60 and the second cells 62 are arranged in a quincunx (or chequered) pattern. This type of structure allows any clearance to be significantly reduced, or even eliminated, while facilitating demoulding. This geometry is therefore of economic benefit by simplifying the injection process while lowering the weight of the part by a reduction in the excess thickness at the base of the rib. In addition and in particular, this lack of clearance allows for homogeneous wall thicknesses at all points of the cells 60, 62 of the vertical connecting beams 38, which improves the behaviour of said struts in a crash. In fact, obtaining cells of constant thickness in a quincunx pattern allows a homogenous indentation force to be obtained under medium-speed (Danner) impacts, which is a very desirable characteristic for improving compactness and optimising energy dissipation while maintaining the structural components (side struts and extensions).

The cellular structure of the connecting beams 38 gives them sufficient energy absorption capacity with low thickness (in the longitudinal direction).

The connecting beams 38 advantageously have a thickness of between 100 and 200 mm. This allows effective energy absorption, while limiting the projection of the front-end panel assembly 1 taken between the plates 16 and the front end of the bumper 4. It is important to note that the assembly formed by the absorption ramps of the structural frame and the vertical connecting beams of the bumper, on the vehicle side, work together to dissipate most of the energy in a Danner impact, specifically over 75%. The connecting beams and ramps ideally distribute said energy percentage equitably, but this dissipation equilibrium may clearly be displaced towards one or other of the two parts.

The cellular structure of the vertical connecting beams 38, or posts, thus improves the behaviour of the bumper under Danner impacts.

A bumper skin (not shown) is fixed to the front face of the bumper 4 in such a way that it substantially covers said bumper and makes the front of the motor vehicle look attractive. In accordance with an embodiment, the bumper skin is formed of a plurality of panels shaped so as to form the skin. These panels are thin, for example substantially between 1.5 mm and 3 mm thick, which reduces the weight and bulk of the skin. A thickness of this type may be provided since the bumper skin does not perform any structural function during the absorption of impacts, this function being performed by the bumper 4 and the structural frame 2. The skin thus has a purely aesthetic function, and this makes it possible to reduce its thickness so as to reduce its weight and production cost.

The front face of the bumper 4 also receives functional accessories (not shown) of the motor vehicle, such as headlights, a ventilation grille received in the opening 46 and, optionally, controllable flaps arranged behind the grille which make it possible to guide air in an optimal manner.

In order to ensure that the various components are fixed in place, the front face 39 of the bumper 4 is provided with a plurality of fixing means enabling the panels of the bumper skin and motor vehicle accessories to be fixed. For example, these fixing means are formed by grooves and orifices for receiving complementary fixing members provided on the panels and on the motor vehicle accessories, which makes it possible to assemble and disassemble panels and accessories as desired. For example, these fixing members are formed in one piece with the panels.

The bumper 4 may be produced easily by the injection moulding of a plastics material. It may be demoulded in a single direction corresponding to the longitudinal direction of the motor vehicle when the bumper 4 is fixed on the chassis. Thus, the assembly 1 may be obtained easily, at a low manufacturing cost. The cellular structure of the vertical connecting beams 38 allows for small clearances which helps limit the weight and manufacturing cost of the bumper 4.

The front-end panel assembly described above allows a metal transverse beam and flexible pedestrian absorption components to be dispensed with. The weight and bulk of the front-end panel assembly 1 are therefore reduced. However, in order to increase the strength of the vehicle under impact or to ensure that the side struts do not separate, it may be possible, depending on the structure, to add an anti-separation member (a metal tie or cable) between the side struts. Moreover, the structure of the bumper 4 and of the structural frame 2 ensures that the front-end panel assembly 1 behaves effectively under impact, whatever the type of impact. The energy absorption under impact is thus optimised.

What is claimed is:

1. A motor vehicle front-end panel assembly of a type fixed to side struts and cradle extensions of a motor vehicle chassis, said assembly comprising:
    a plastic material structural frame comprising at least a lower cross member and vertical struts,
    each of said struts forming, over at least a portion of its height,
    a deformable energy absorption component,
    the assembly further comprising a plastic material bumper formed so as to match a shape of a bumper skin and arranged against the structural frame, said bumper comprising an upper cross member and a lower cross member interconnected via vertical connecting beams, the upper and lower cross members each having a central portion and two lateral portions arranged on either side of the central portion, said cross members comprising a plurality of ribs, wherein a concentration of ribs in at least one of the central portion of the upper cross member and of the lower cross member is greater than a concentration of ribs of each lateral portion of at least one of the upper cross member and of the lower cross member,
    wherein the vertical connecting beams have a cellular structure comprising of cells extending longitudinally through the beams and opening onto at least one of a rear face and a front face of the bumper, and
    each connecting beam comprises first blind cells, closed on the rear face side and open on the front face side, and second blind cells open on the rear face side and closed on the front face side.

2. The front-end panel assembly according to claim 1, wherein the ribs define cells, at least some of the cells passing longitudinally through the upper cross member and the lower cross member.

3. The front-end panel assembly according to claim 1, wherein the central portion of the upper cross member, or the lower cross member, extends over a width of substantially between 400 mm and 600 mm at the centre of the upper cross member, or at that of the lower cross member respectively.

4. The front-end panel assembly according to claim 1, wherein the ribs of the central portion of at least one of the upper and the lower cross member are spaced at a distance of substantially between 45 mm and 90 mm and the ribs of the lateral portions of at least one of the upper and lower cross member are spaced at a distance of substantially between 60 mm and 120 mm.

5. The front-end panel assembly according to claim 1, further comprising two extended metal plates, of which a one face is pressed onto side struts and cradle extensions of the motor vehicle chassis, the vertical struts of the structural frame being arranged against an other face of said extended metal plates.

6. The front-end panel assembly according to claim 1, wherein the front face of the bumper is equipped with a plurality of fixing means enabling a bumper skin and/or motor vehicle accessories to be fixed to said bumper.

7. The front-end panel assembly according to claim 1, wherein the bumper is formed in one piece.

8. The front-end panel assembly according to claim 1, wherein the upper and lower cross members of the bumper comprise at least a portion projecting in a forward direction relative to the vertical connecting beams.

9. A motor vehicle front-end panel assembly of a type fixed to side struts and cradle extensions of a motor vehicle chassis, said assembly comprising:
    a plastic material structural frame comprising at least a lower cross member and vertical struts,
    each of said struts forming, over at least a portion of its height,
    a deformable energy absorption component,
    the assembly further comprising a plastic material bumper formed so as to match a shape of a bumper skin and arranged against the structural frame, said bumper comprising an upper cross member and a lower cross member interconnected via vertical connecting beams, the upper and lower cross members each having a central portion and two lateral portions arranged on either side of the central portion, said cross members comprising a plurality of ribs, wherein a concentration of ribs in at least one of the central portion of the upper cross member and of the lower cross member is greater than a concentration of ribs of each lateral portion of at least one of the upper cross member and of the lower cross member,
    the assembly further comprises two extended metal plates, of which a one face is pressed onto side struts and cradle extensions of the motor vehicle chassis, the vertical struts of the structural frame being arranged against another face of said extended metal plates.

* * * * *